(«12») United States Patent
Suzuki et al.

(10) Patent No.: US 10,286,959 B2
(45) Date of Patent: *May 14, 2019

(54) SIDE-BY-SIDE ALL TERRAIN VEHICLE INCLUDING FRONT COVER

(71) Applicant: YAMAHA HATSUDOKI KABUSHIKI KAISHA, Iwata-shi, Shizuoka (JP)

(72) Inventors: Yasuhiro Suzuki, Shizuoka (JP); Masayuki Kubo, Shizuoka (JP); Takuhiro Shinozaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 18 days.

This patent is subject to a terminal disclaimer.

(21) Appl. No.: 15/826,758

(22) Filed: Nov. 30, 2017

(65) Prior Publication Data

US 2018/0079453 A1    Mar. 22, 2018

Related U.S. Application Data

(63) Continuation of application No. 14/809,293, filed on Jul. 27, 2015, now Pat. No. 9,862,425.

(30) Foreign Application Priority Data

Jul. 29, 2014    (JP) ................................ 2014-153802

(51) Int. Cl.
*B62D 25/10* (2006.01)
*B62D 21/18* (2006.01)
*B62D 23/00* (2006.01)

(52) U.S. Cl.
CPC ........... *B62D 25/10* (2013.01); *B62D 21/183* (2013.01); *B62D 23/005* (2013.01)

(58) Field of Classification Search
CPC ..... B62D 21/183; B62D 23/005; B62D 25/10
See application file for complete search history.

(56) References Cited

U.S. PATENT DOCUMENTS

| 9,327,587 B2* | 5/2016 | Spindler | .............. B62D 23/005 |
| 9,862,425 B2* | 1/2018 | Suzuki | .................. B62D 25/10 |
| 2016/0280058 A1* | 9/2016 | Uzaki | ................. B62D 25/082 |

OTHER PUBLICATIONS

Suzuki et al., "Side-by-Side All Terrain Vehicle Including Front Cover", U.S. Appl. No. 14/809,293, filed Jul. 27, 2015.

* cited by examiner

*Primary Examiner* — Barry Gooden, Jr.
(74) *Attorney, Agent, or Firm* — Keating and Bennett, LLP

(57) ABSTRACT

An ROV (Recreational Off-highway Vehicle) includes a plurality of seats located next to each other in a vehicle width direction, a left shock absorber, a right shock absorber, and a front cover. An opening is provided in the front cover. An upper end portion of the left shock absorber and an upper end portion of the right shock absorber are visible within the opening when the vehicle is seen from above.

20 Claims, 11 Drawing Sheets

SIDE-BY-SIDE ALL TERRAIN VEHICLE INCLUDING FRONT COVER

The present application claims priority to Japanese Patent Application No. 2014-153802, filed on Jul. 29, 2014, the disclosure of which is hereby incorporated by reference in its entirety.

BACKGROUND OF THE INVENTION

1. Field of the Invention

The present invention relates to a vehicle including a plurality of seats located next to each other in a vehicle width direction.

2. Description of the Related Art

There are known vehicles including a plurality of seats located next to each other in the vehicle width direction and being capable of running on uneven terrain, such as ROVs (Recreational Off-highway Vehicles) and side-by-side ATVs (All Terrain Vehicles). Vehicles running on uneven terrain are required to absorb impacts and damp vibrations while running. Shock absorbers have been used to absorb impacts and damp vibrations in these vehicles.

U.S. Pat. Nos. 7,819,220, 7,278,648 and U.S. Patent Application Publication No. 2011/0048833 disclose vehicles including left and right front wheels, and left and right shock absorbers connected to the left and right front wheels, respectively. These vehicles include a front cover integral with front wheel fenders. The shock absorbers are located under the front cover. The shock absorbers are hidden under the front cover and are not visible when the vehicle is seen from above.

Some vehicles capable of running on uneven terrain are required to have an improved running performance than before. In order to improve the running performance, it is preferred to elongate the stroke of the shock absorbers. Since it is difficult, due to the vehicle layout, to raise the position of the lower end portion of the shock absorber, elongating the stroke requires raising the position of the upper end portion of the shock absorber. Then, it is necessary to locate the front cover at a higher position in order to avoid interference between the upper end portion of the shock absorber and the front cover. On the other hand, vehicles capable of running on uneven terrain are preferred to have a desirable front visibility when climbing up a steep hill, for example. For improved visibility, the position of the front cover is preferably low. With conventional vehicles, however, it has been difficult to improve the front visibility while providing an increased stroke for the shock absorbers of the front wheels.

SUMMARY OF THE INVENTION

Preferred embodiments of the present invention have been made in view of the problems set forth above, and provide a vehicle, such as an ROV, including a plurality of seats located next to each other in the vehicle width direction with which it is possible to provide both an improved stroke for the shock absorbers of the front wheels and an improved front visibility.

A vehicle according to a preferred embodiment of the present invention includes a vehicle body frame; a plurality of seats located next to each other in a vehicle width direction, each of the plurality of seats being supported on the vehicle body frame; a left front wheel located forward of the plurality of seats; a right front wheel located forward of the plurality of seats and to the right of the left front wheel; a left arm extending in the vehicle width direction, the left arm including a wheel connection portion connected to the left front wheel and a frame connection portion pivotally connected to the vehicle body frame; a right arm located to the right of the left arm and extending in the vehicle width direction, the right arm including a wheel connection portion connected to the right front wheel and a frame connection portion pivotally connected to the vehicle body frame; a left shock absorber including an upper end portion pivotally connected to the vehicle body frame, and a lower end portion pivotally connected to the left arm; a right shock absorber located to the right of the left shock absorber, the right shock absorber including an upper end portion pivotally connected to the vehicle body frame and a lower end portion pivotally connected to the right arm; and a front cover located forward of the plurality of seats and located above the left arm, the right arm, the lower end portion of the left shock absorber, and the lower end portion of the right shock absorber. At least one opening is provided in the front cover. The upper end portion of the left shock absorber and the upper end portion of the right shock absorber are located so as to be visible within the at least one opening when the vehicle is seen from above.

With the vehicle set forth above, the upper end portion of the left shock absorber and the upper end portion of the right shock absorber are located so as to be visible within the at least one opening of the front cover when the vehicle is seen from above. Even if the positions of the upper end portions of the shock absorbers are high, or the position of the front cover is low, the upper end portions of the shock absorbers and the front cover will not interfere with each other. Therefore, the positions of the upper end portions of the shock absorbers are raised to provide an improved stroke for the shock absorbers. Moreover, the position of the front cover is able to be lowered to provide improved front visibility. Thus, with the vehicle set forth above, it is possible to provide both an improved stroke for the shock absorbers and an improved front visibility.

According to a preferred embodiment of the present invention, the front cover includes a sloped portion sloping downward toward a front of the vehicle, and a peak portion located at a rear end of the sloped portion. The peak portion of the front cover is located rearward of the upper end portion of the left shock absorber and the upper end portion of the right shock absorber.

With the preferred embodiment set forth above, the upper end portion of the left shock absorber and the upper end portion of the right shock absorber are located forward of the peak portion of the front cover. Even if the positions of the upper end portion of the left shock absorber and the upper end portion of the right shock absorber are high, the portion of the front cover that is forward of the peak portion is a sloped portion sloping downward to the front of the vehicle, thus providing an improved front visibility.

According to another preferred embodiment of the present invention, the front cover includes a sloped portion sloping downward toward the front of the vehicle, and a peak portion located at a rear end of the sloped portion. The at least one opening is preferably provided in the sloped portion.

With the preferred embodiment set forth above, the at least one opening is provided in the sloped portion, which is located forward of the peak portion. Even if the positions of the upper end portion of the left shock absorber and the upper end portion of the right shock absorber are high, the portion of the front cover that is forward of the peak portion is a sloped portion sloping downward toward the front of the vehicle, thus providing an improved front visibility.

According to another preferred embodiment of the present invention, the upper end portion of the left shock absorber and the upper end portion of the right shock absorber are located so as to be visible when the vehicle is seen from the front of the vehicle.

With the preferred embodiment set forth above, the upper end portion of the left shock absorber and the upper end portion of the right shock absorber are located above at least a portion of the at least one opening of the front cover. Therefore, the front cover is located at a low position while ensuring a good stroke for the left shock absorber and the right shock absorber. This ingeniously provides both an improved stroke for the shock absorbers and an improved front visibility.

According to another preferred embodiment of the present invention, the upper end portion of the left shock absorber and the upper end portion of the right shock absorber are located above the at least one opening of the front cover.

With the preferred embodiment set forth above, the upper end portion of the left shock absorber and the upper end portion of the right shock absorber project upward past the at least one opening of the front cover. It is possible to locate the front cover at a low position while locating the upper end portion of the left shock absorber and the upper end portion of the right shock absorber at high positions. This ingeniously provides both an improved stroke for the shock absorbers and an improved front visibility.

According to another preferred embodiment of the present invention, the front cover includes a first front cover member including a first peripheral portion defining a portion of the at least one opening; and a second front cover member including a second peripheral portion defining another portion of the at least one opening, and being attached to the first front cover member.

With the preferred embodiment set forth above, the at least opening does not need to be provided by a single cover member. At least a portion of the at least one opening is provided by assembling together the first front cover member and the second front cover member, and it is therefore possible to easily manufacture the front cover including the at least one opening. It is also possible to maintain the left shock absorber or the right shock absorber by removing only the first front cover member or the second front cover member without having to remove the entire front cover. Thus, it is possible to easily maintain the left shock absorber and the right shock absorber.

According to another preferred embodiment of the present invention, the at least one opening includes a left opening and a right opening located to the right of the left opening. The upper end portion of the left shock absorber is located so as to be visible within the left opening when the vehicle is seen from above. The upper end portion of the right shock absorber is located so as to be visible within the right opening when the vehicle is seen from above.

The upper end portion of the left shock absorber and the upper end portion of the right shock absorber are preferably located so as to be visible within the same opening in the front cover when the vehicle is seen from above. With the preferred embodiment set forth above, however, the upper end portion of the left shock absorber is located so as to be visible within the left opening and the upper end portion of the right shock absorber is located so as to be visible within the right opening when the vehicle is seen from above, allowing the left opening and the right opening to each have a small opening area. Therefore, it is unlikely that an object flies into the front cover through the left opening or the right opening. Also, the front cover has a high rigidity.

According to another preferred embodiment of the present invention, a peripheral portion of the at least one opening of the front cover includes a left peripheral portion located to the left of the upper end portion of the left shock absorber when the vehicle is seen from above, and a right peripheral portion located to the right of the upper end portion of the right shock absorber when the vehicle is seen from above.

With the preferred embodiment set forth above, the left side of the upper end portion of the left shock absorber is protected by the left peripheral portion of the front cover. The right side of the upper end portion of the right shock absorber is protected by the right peripheral portion of the front cover. Therefore, when a stone or the like, travels toward the vehicle from the left or right of the vehicle while running, the upper end portion of the shock absorber is protected from the stone or the like.

According to another preferred embodiment of the present invention, a perimeter of the at least one opening is closed when the vehicle is seen from above.

With the preferred embodiment set forth above, the front cover has a high rigidity.

According to another preferred embodiment of the present invention, the at least one opening is provided in a front half of the front cover.

With the preferred embodiment set forth above, a sufficient front visibility is ensured.

According to another preferred embodiment of the present invention, when the vehicle is seen from above, an area of the at least one opening is greater than a cross-sectional area of the left shock absorber, and is greater than a cross-sectional area of the right shock absorber.

With the preferred embodiment set forth above, since the opening has a large area, it is possible to more reliably avoid interference between the upper end portion of the left shock absorber and the upper end portion of the right shock absorber and the front cover. Therefore, the positions of the upper end portions of the shock absorbers are sufficiently high, and the position of the front cover is sufficiently low. This ingeniously provides both an improved stroke for the shock absorbers and an improved front visibility.

According to another preferred embodiment of the present invention, the vehicle further includes a left damping force adjuster attached to the left shock absorber to adjust a damping force of the left shock absorber; and a right damping force adjuster attached to the right shock absorber to adjust a damping force of the right shock absorber. At least a portion of the left damping force adjuster and at least a portion of the right damping force adjuster are located above the at least one opening or located so as to be visible through the at least one opening.

With the preferred embodiment set forth above, the left damping force adjuster and the right damping force adjuster are adjustable from outside the front cover. Therefore, the left damping force adjuster and the right damping force adjuster are adjusted easily, thus making it possible to easily adjust the damping forces of the left shock absorber and the right shock absorber.

According to another preferred embodiment of the present invention, the left damping force adjuster is located to the left of the left shock absorber, and the right damping force adjuster is located to the right of the right shock absorber.

With the preferred embodiment set forth above, the left damping force adjuster is easily adjusted from the left side of the vehicle, and the right damping force adjuster is easily adjusted from the right side of the vehicle. Thus, it is possible to easily adjust the damping forces of the left shock absorber and the right shock absorber.

According to another preferred embodiment of the present invention, the left shock absorber includes a left damper and a left spring attached to the left damper, the left damper including a left cylinder and a left piston rod slidably inserted in the left cylinder. The right shock absorber includes a right damper and a right spring attached to the right damper, the right damper including a right cylinder and a right piston rod slidably inserted in the right cylinder. An upper end portion of the left damper and an upper end portion of the right damper define the upper end portion of the left shock absorber and the upper end portion of the right shock absorber, respectively. At least a portion of the left spring and at least a portion of the right spring are located so as to be visible within the at least one opening when the vehicle is seen from above.

With the preferred embodiment set forth above, the left spring and the right spring are unlikely to interfere with the front cover, allowing the position of the front cover to be low. Thus, it is possible to provide an improved front visibility.

According to another preferred embodiment of the present invention, the vehicle further includes a ring-shaped steering handle located in front of one of the plurality of seats to control steering the left front wheel and the right front wheel.

With the preferred embodiment set forth above, the advantageous effects described above are realized with vehicles including a ring-shaped steering handle.

According to another preferred embodiment of the present invention, the vehicle further includes a radiator located under the front cover and rearward of the left shock absorber and the right shock absorber.

With the preferred embodiment set forth above, a space to the rear of the left shock absorber and the right shock absorber are effectively utilized as a space to accommodate the radiator. The radiator is located under the front cover while providing both an improved stroke for the shock absorbers and an improved front visibility.

According to another preferred embodiment of the present invention, a portion of the left shock absorber and a portion of the radiator are located next to each other in a vehicle front-rear direction. A portion of the right shock absorber and another portion of the radiator are located next to each other in the vehicle front-rear direction.

With the preferred embodiment set forth above, as compared with a case where the left shock absorber, the radiator, and the right shock absorber are located next to one another in the vehicle width direction, it is possible to reduce the size of the vehicle in the vehicle width direction. Therefore, it is possible to reduce the size of the vehicle in the vehicle width direction while providing both an improved stroke for the shock absorbers and an improved front visibility.

According to the various preferred embodiments of the present invention, it is possible to provide a vehicle including a plurality of seats located next to each other in the vehicle width direction, with which it is possible to provide both an improved stroke for the shock absorbers of the front wheels and an improved front visibility.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described. As shown in FIGS. 1 to 4, a vehicle of the present preferred embodiment preferably is an ROV 1, for example. The ROV 1 is a vehicle suitable for running on uneven terrain. Note, however, that the vehicle of the present invention is not limited to an ROV, but may be any vehicle including a plurality of seats located next to each other in the vehicle width direction, e.g., a side-by-side ATV.

The terms front, rear, left, right, up and down, as used in the description below, refer to these directions as seen from a passenger seated in a seat 11 of the ROV 1 while the ROV 1 is stationary on a horizontal surface, unless specified otherwise. The designations F, Re, L, R, U and D, as used in the figures, refer to front, rear, left, right, up and down, respectively.

Figure 1:
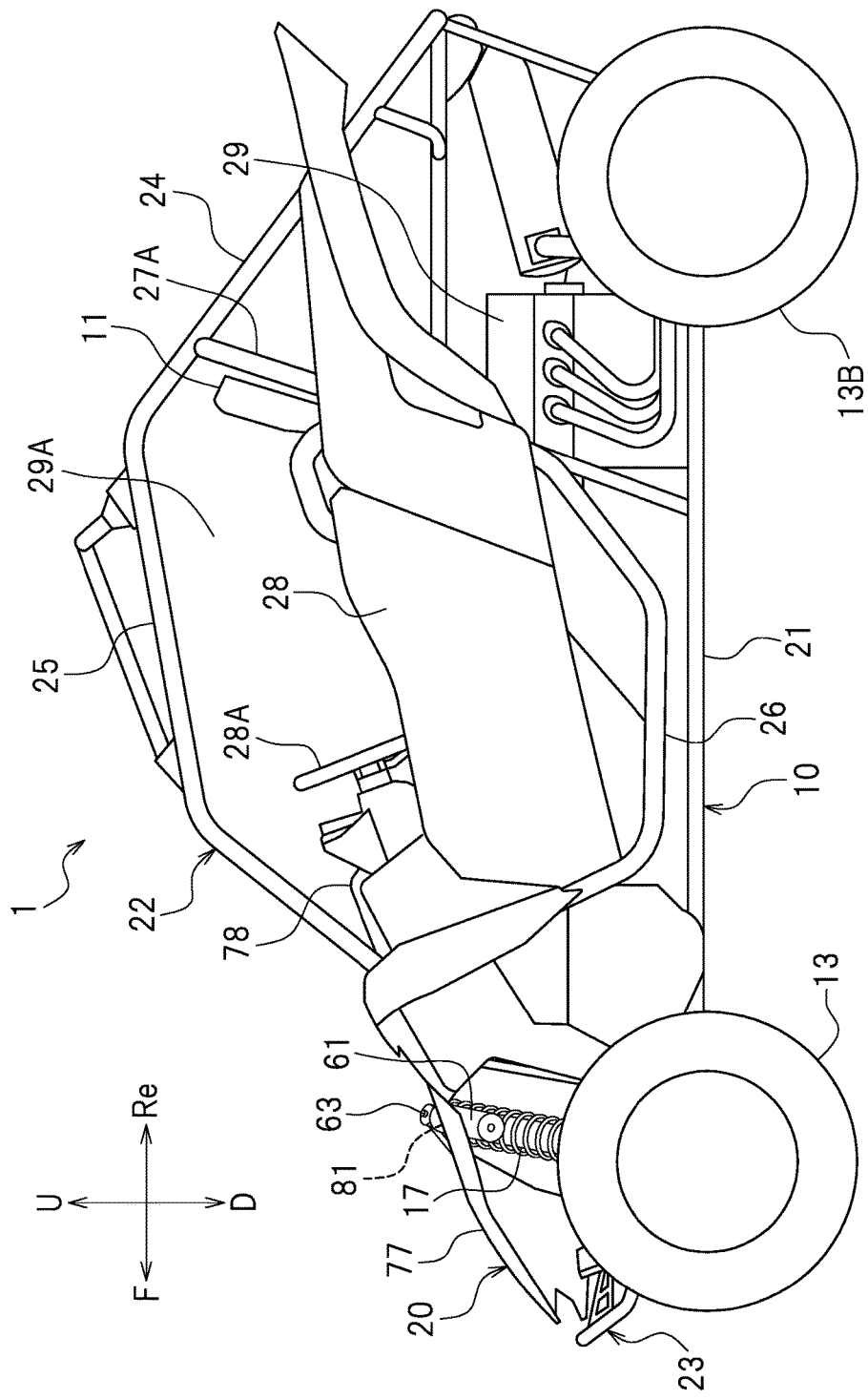
FIG. 1 is a left side view showing an ROV according to a preferred embodiment of the present invention.
Figure 2:
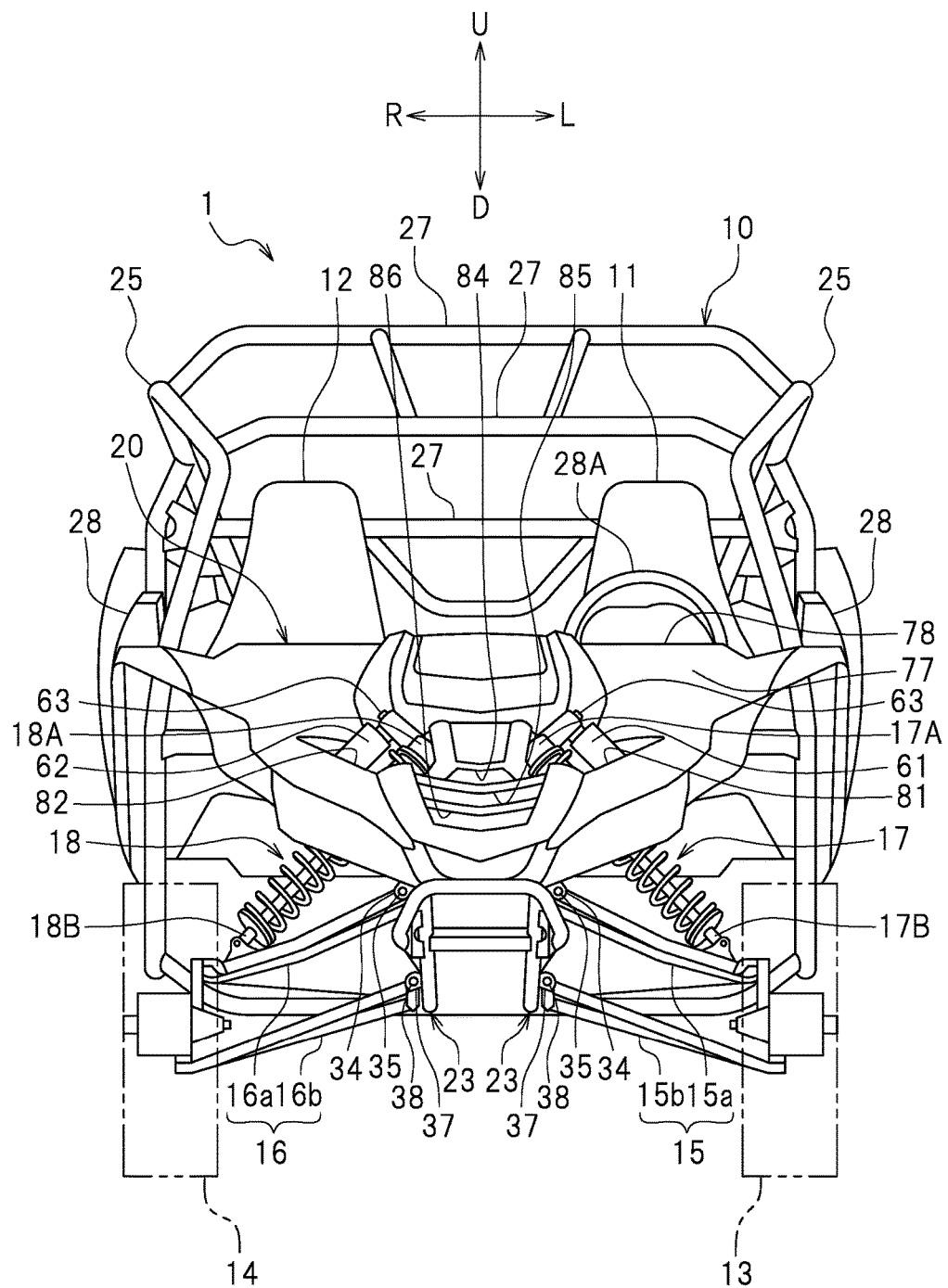
FIG. 2 is a front view showing the ROV.

As shown in FIGS. 1 and 2, the ROV 1 includes a vehicle body frame 10, an engine 29, a left seat 11, and a right seat 12 located next to each other in the vehicle width direction, a left front wheel 13, a right front wheel 14, a left rear wheel 13B, and a right rear wheel (not shown). The ROV 1 further includes a left arm 15 connected to the left front wheel 13, a right arm 16 connected to the right front wheel 14, a left shock absorber 17, a right shock absorber 18, and a front cover 20. Note that the vehicle width direction refers to the vehicle left-right direction.

There is no particular limitation on the configuration of the vehicle body frame 10. In the present preferred embodiment, as shown in FIG. 1, the vehicle body frame 10 includes left and right main frames 21 extending in the vehicle front-rear direction, left and right center frames 22 located above the left and right main frames 21, respectively, left and right front frames 23 located forward of the left and right center frames 22, respectively, and left and right rear frames 24 located rearward of the left and right center frames 22, respectively.

The center frame 22 includes an upper center frame 25, a lower center frame 26, and a vertical center frame 27A. The upper center frame 25 is bent so as to protrude upward as seen from the side of the vehicle. The lower center frame 26 is bent so as to protrude downward as seen from the side of the vehicle. The front end portion of the upper center frame 25 is connected to the front end portion of the lower center frame 26 (see FIG. 7). The upper end portion of the vertical center frame 27A is connected to the rear end portion of the upper center frame 25, and the lower end portion of the vertical center frame 27A is connected to the rear end portion of the lower center frame 26. The upper center frame 25, the lower center frame 26, and the vertical center frame 27A together define a passenger space as seen from the side of the vehicle.

A door 28 is located under the upper center frame 25 as seen from the side of the vehicle. In the ROV 1 of the present preferred embodiment, the door 28 preferably does not include window glass. Between the upper center frame 25 and the door 28 is an opening 29A, which is open all the time. The door 28 is arranged so that it can be opened/closed, and is provided with an open/close lever (not shown) on the inside of the door 28. There is no open/close lever provided on the outside of the door 28.

As shown in FIG. 2, the left center frame 22 and the right center frame 22 are linked together by a plurality of cross members 27 extending in the left-right direction. Although not shown in the figures, the left main frame 21 and the right main frame 21 are linked together by a plurality of cross members extending in the left-right direction.

The left seat 11 and the right seat 12 are seats where passengers (not shown) are seated. The left seat 11 and the right seat 12 are supported on the vehicle body frame 10. The left seat 11 and the right seat 12 are located within the passenger space. As shown in FIG. 1, the left seat 11 and the right seat 12 are located under the upper center frame 25 and over the lower center frame 26 as seen from the side of the vehicle.

A ring-shaped steering handle 28A is located in front of the left seat 11. The steering handle 28A controls steering of the left front wheel 13 and the right front wheel 14, and is operated by the passenger who is seated in the left seat 11. The ROV 1 turns left when the passenger turns the steering handle 28A to the left, and turns right when the passenger turns the steering handle 28A to the right. The steering handle 28A is linked to the left front wheel 13 and the right front wheel 14 via a steering link mechanism (not shown). Note that there is no particular limitation on the position of the steering handle 28A, and it may be located in front of the right seat 12.

Figure 5:
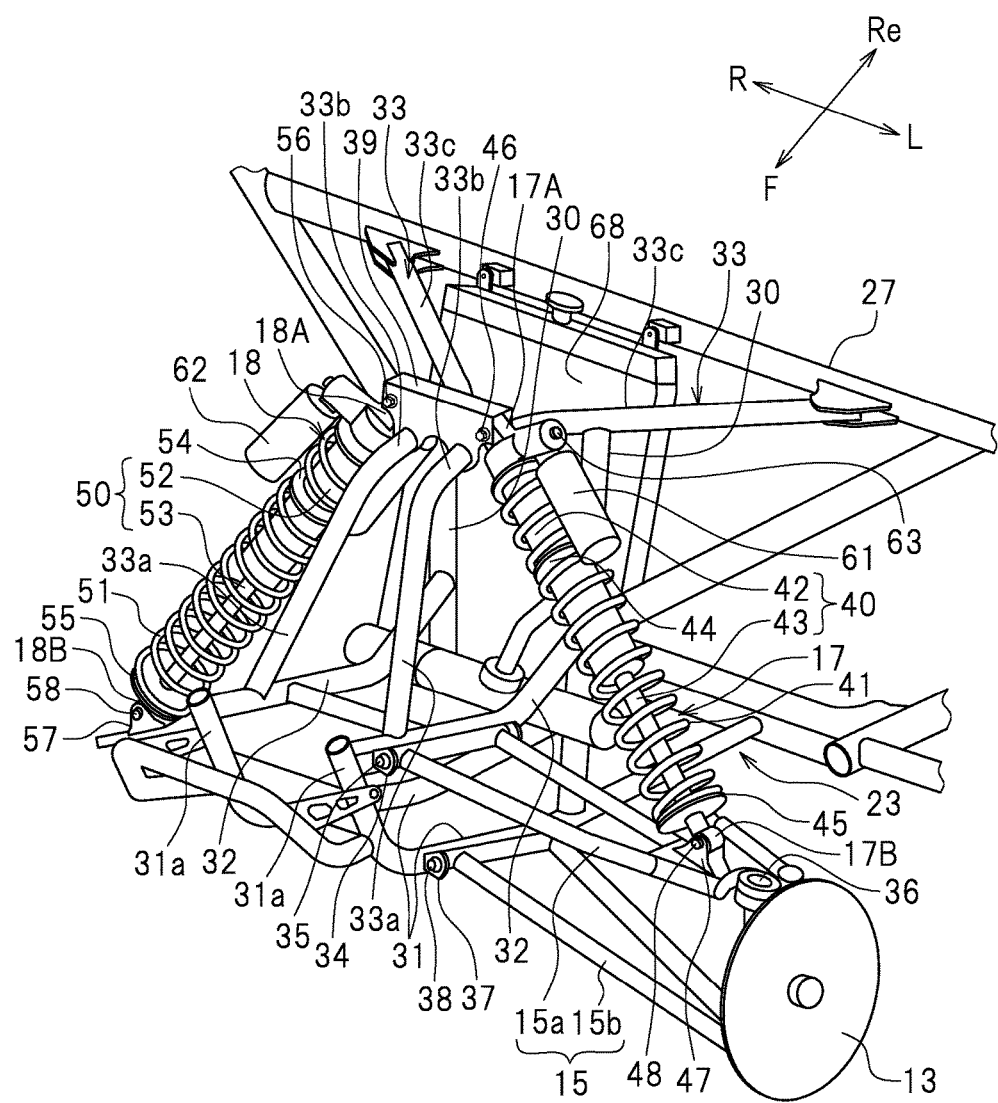
FIG. 5 is a perspective view showing primary components in the front portion of the ROV.
Figure 6:
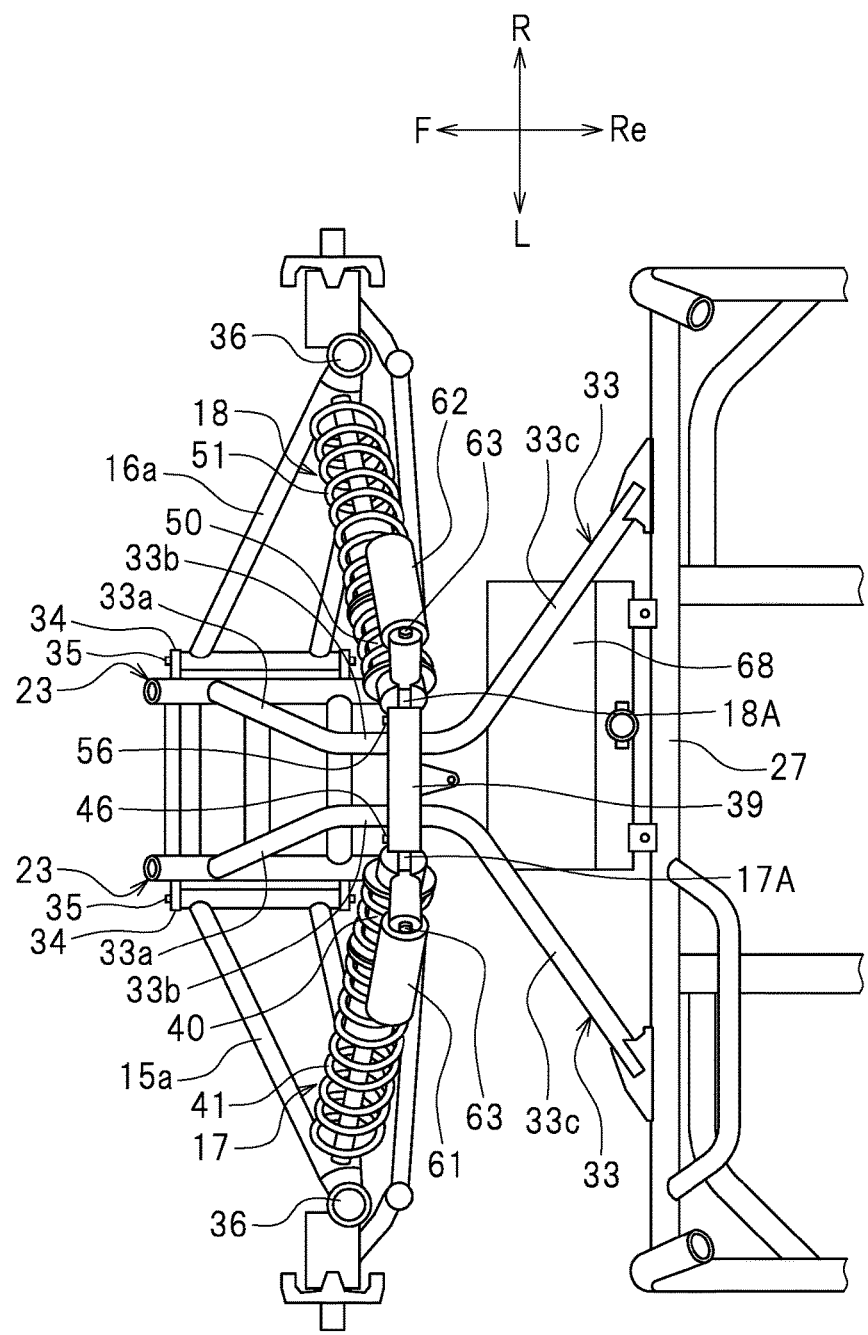
FIG. 6 is a plan view showing primary components in the front portion of the ROV.
Figure 7:
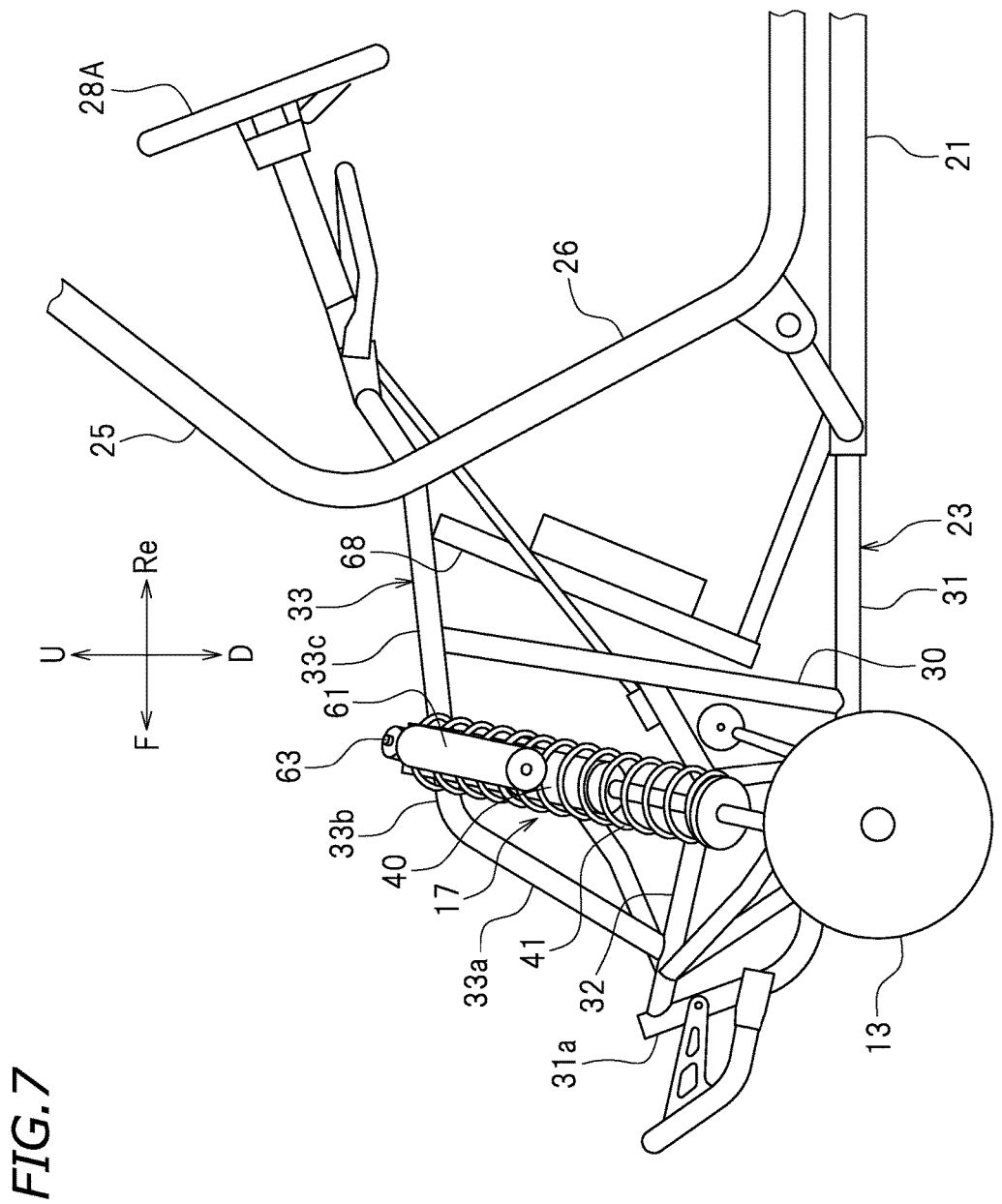
FIG. 7 is a left side view showing primary components in the front portion of the ROV.

FIGS. 5, 6, and 7 are a perspective view, a plan view, and a left side view, respectively, showing primary components in the vehicle front section of the ROV 1. As shown in FIG. 7, the left and right front frames 23 each include a vertical frame 30, a lower frame 31, a middle frame 32, and an upper frame 33. The lower end portion of the vertical frame 30 is connected to the lower frame 31, and the upper end portion of the vertical frame 30 is connected to the upper frame 33. The lower frame 31 extends in the vehicle front-rear direction, and is bent to define a front portion 31a extending in a diagonally upward direction. The middle frame 32 is located substantially over the lower frame 31. The middle frame 32 extends in the vehicle front-rear direction. The middle frame 32 is bent in a V-letter shape as seen from the side. The rear end portion of the middle frame 32 is connected to the vertical frame 30, and the front end portion of the middle frame 32 is connected to the front portion 31a of the lower frame 31. The upper frame 33 is located over the middle frame 32 and the lower frame 31. The upper frame 33 includes a vertical portion 33a extending diagonally in a lower front direction, a horizontal portion 33b extending rearwardly from the vertical portion 33a, and an inclined portion 33c extending rearwardly from the horizontal portion 33b and outwardly in the vehicle width direction, as shown in FIG. 6. The lower end portion of the vertical portion 33a of the upper frame 33 is connected to the middle frame 32. The rear end portion of the inclined portion 33c of the upper frame 33 is connected to the cross member 27. Note that the above configuration of the front frame 23 is merely illustrative, and the present invention is not limited thereto.

As shown in FIG. 2, the left arm 15 links together the left front frame 23 and the left front wheel 13. The left arm 15 includes an upper arm 15a and a lower arm 15b located under the upper arm 15a. The upper arm 15a and the lower arm 15b extend diagonally in a lower left direction. As shown in FIG. 5, the proximal portion of the upper arm 15a is rotatably attached to a bracket 34 provided on the middle frame 32. The proximal portion of the lower arm 15b is rotatably attached to a bracket 37 provided on the lower frame 31. Specifically, the proximal portion of the upper arm 15a is attached to the bracket 34 by a shaft 35 extending in the vehicle front-rear direction. The proximal portion of the lower arm 15b is attached to the bracket 37 by a shaft 38 extending in the vehicle front-rear direction. The upper arm 15a rotates about the shaft 35, and the lower arm 15b rotates about the shaft 38. The proximal portion of the upper arm 15a and the proximal portion of the lower arm 15b are each an example of a "frame connection portion", which is pivotally connected to the vehicle body frame 10. The distal portion of the upper arm 15a and the distal portion of the lower arm 15b are connected to the left front wheel 13 by a kingpin shaft 36. The left front wheel 13 is connected to the distal portion of the upper arm 15a and the distal portion of the lower arm 15b so that the left front wheel 13 rotates left and right. The distal portion of the upper arm 15a and the distal portion of the lower arm 15b are each an example of a "wheel connection portion", which is connected to the left front wheel 13.

As shown in FIG. 2, the right arm 16 links together the right front frame 23 and the right front wheel 14. The right arm 16 preferably has a similar configuration to that of the left arm 15, and is located in left-right symmetry with respect to the left arm 15. The right arm 16 is located to the right of the left arm 15. The right arm 16 includes an upper arm 16a and a lower arm 16b located under the upper arm 16a. The upper arm 16a and the lower arm 16b extend diagonally in a lower right direction. The proximal portion of the upper arm 16a is rotatably attached to the bracket 34 provided on the middle frame 32. The proximal portion of the lower arm 16b is rotatably attached to the bracket 37 provided on the lower frame 31. Specifically, the proximal portion of the upper arm 16a is attached to the bracket 34 by a shaft 35 extending in the vehicle front-rear direction. The proximal portion of the lower arm 16b is attached to the bracket 37 by a shaft 38 extending in the vehicle front-rear direction. The upper arm 16a rotates about the shaft 35, and the lower arm 16b rotates about the shaft 38. The proximal portion of the upper arm 16a and the proximal portion of the lower arm 16b are each an example of a "frame connection portion", which is pivotally connected to the vehicle body frame 10. The distal portion of the upper arm 16a and the distal portion of the lower arm 16b are connected to the right front wheel 14 by a kingpin shaft 36. The right front wheel 14 is connected to the distal portion of the upper arm 16a and the distal portion of the lower arm 16b so that the right front wheel 14 rotates left and right. The distal portion of the upper arm 16a and the distal portion of the lower arm 16b are each an example of a "wheel connection portion", which is connected to the right front wheel 14. Note that the left arm 15 and the right arm 16 described above are merely illustrative, and the present invention is not limited thereto.

The left shock absorber 17 absorbs impacts received by the left front wheel 13. As shown in FIG. 2, the left shock absorber 17 extends diagonally in an upper right direction. As shown in FIG. 5, the left shock absorber 17 includes a left damper 40, and a left spring 41 located around the left damper 40. The left damper 40 includes a left cylinder 42 and a left piston rod 43 slidably inserted in the left cylinder 42. The left cylinder 42 is provided with a spring receiver 44 by which an upper portion of the left spring 41 is locked. The left piston rod 43 is provided with a spring receiver 45 by which a lower portion of the left spring 41 is locked. While the spring receivers 44 and 45 are ring-shaped in the present preferred embodiment, there is no particular limitation on the shape of the spring receivers 44 and 45. At least a portion of the left spring 41 is located between the spring receiver 44 and the spring receiver 45. In the present preferred embodiment, the left damper 40 preferably is a hydraulic damper, for example, and oil is accommodated in the left cylinder 42. Note, however, that the fluid to be accommodated in the left cylinder 42 is not limited to oil, but may be air, for example.

The left and right upper frames 33 are provided with a bracket 39. An upper end portion 17A of the left shock absorber 17 is rotatably attached to the bracket 39. In the present preferred embodiment, the upper end portion of the left cylinder 42 of the left damper 40 defines the upper end portion 17A of the left shock absorber 17. The upper end portion 17A of the left cylinder 42 is attached to the bracket 39 by a shaft 46 extending in the vehicle front-rear direction. The left shock absorber 17 rotates about the shaft 46.

A bracket 47 is provided at the distal portion of the left arm 15. In the present preferred embodiment, the bracket 47 is provided at the distal portion of the upper arm 15a. A lower end portion 17B of the left shock absorber 17 is rotatably attached to the bracket 47. In the present preferred embodiment, a lower portion of the left piston rod 43 of the left damper 40 defines the lower end portion 17B of the left shock absorber 17. The lower end portion 17B of the left piston rod 43 is attached to the bracket 47 by a shaft 48 extending in the vehicle front-rear direction. The left shock absorber 17 rotates about the shaft 48.

The right shock absorber 18 absorbs impacts received by the right front wheel 14. The right shock absorber 18 preferably has a similar configuration to that of the left shock absorber 17, and is located in left-right symmetry with respect to the left shock absorber 17. The right shock absorber 18 is located to the right of the left shock absorber 17. The right shock absorber 18 extends diagonally in an upper left direction. The right shock absorber 18 includes a right damper 50 and a right spring 51 located around the right damper 50. The right damper 50 includes a right cylinder 52 and a right piston rod 53 slidably inserted in the right cylinder 52. At least a portion of the right spring 51 is located between a spring receiver 54 provided on the right cylinder 52, and a spring receiver 55 provided on the right piston rod 53.

An upper end portion 18A of the right shock absorber 18 is attached to the bracket 39 by a shaft 56 extending in the vehicle front-rear direction. The right shock absorber 18 rotates about the shaft 56. A lower end portion 18B of the right shock absorber 18 is attached to a bracket 57 provided at the distal portion of the right arm 16 by a shaft 58 extending in the front-rear direction. The right shock absorber 18 rotates about the shaft 58.

As shown in FIG. 6, a left damping force adjuster 61 that adjusts the damping force of the left shock absorber 17 is located to the left of the left shock absorber 17. Since the left shock absorber 17 is inclined, the left damping force adjuster 61 is also located on the upper side of the left shock absorber 17. The left damping force adjuster 61 is located diagonally above and to the left of the left shock absorber 17. A right damping force adjuster 62 that adjusts the damping force of the right shock absorber 18 is located to the right of the right shock absorber 18. Since the right shock absorber 18 is inclined, the right damping force adjuster 62 is also located on the upper side of the right shock absorber 18. The right damping force adjuster 62 is located diagonally above and to the right of the right shock absorber 18. The right damping force adjuster 62 is located to the right of the left damping force adjuster 61. The left damping force adjuster 61 and the right damping force adjuster 62 each include a control 63 configured to adjust the damping force. In the present preferred embodiment, the control 63 is configured as a manually-operated control dial. However, there is no particular limitation on the configuration of the control 63, and the control 63 may be a screw to be turned by a driver, for example. The controls 63 preferably face upward. Moreover, the control 63 of the left damping force adjuster 61 is faces leftward, while the control 63 of the right damping force adjuster 62 faces rightward.

Note that the left shock absorber 17, the right shock absorber 18, the left damping force adjuster 61, and the right damping force adjuster 62 described above are merely illustrative. Any shock absorber known in the art may be used as the left shock absorber 17 and the right shock absorber 18. Any damping force adjuster known in the art may be used as the left damping force adjuster 61 and the right damping force adjuster 62. In the present preferred embodiment, the configuration of the left shock absorber 17 and that of the right shock absorber 18 are preferably the same, but they may be different from each other. The configuration of the left damping force adjuster 61 and that of the right damping force adjuster 62 are preferably the same, but they may be different from each other.

In the present preferred embodiment, the engine 29 (see FIG. 1) preferably is a water-cooled internal combustion engine, for example. The engine 29 is cooled by a coolant. The ROV 1 includes a radiator 68 configured to radiate heat from the coolant of the engine 29. The radiator 68 is located under the front cover 20. The radiator 68 is located rearward of the left shock absorber 17 and the right shock absorber 18. The radiator 68 overlaps a portion of the left shock absorber 17 and a portion of the right shock absorber 18 when seen from the front side of the vehicle. The radiator 68 is located forward of the left seat 11 and the right seat 12. Note that the engine 29 is not limited to a water-cooled engine, but may be air-cooled. In such a case, the radiator 68 can be omitted.

Next, the front cover 20 will be described. The front cover 20 is located forward of the seats 11 and 12. As shown in FIG. 2, the front cover 20 is located above the left arm 15, the right arm 16, the lower end portion 17B of the left shock absorber 17, and the lower end portion 18B of the right shock absorber 18. Although the left arm 15, the right arm 16, the left shock absorber 17, and the right shock absorber 18 pivot while the ROV 1 is running, the term "located above" as used herein means located above while the ROV 1 is stationary.

Figure 3:
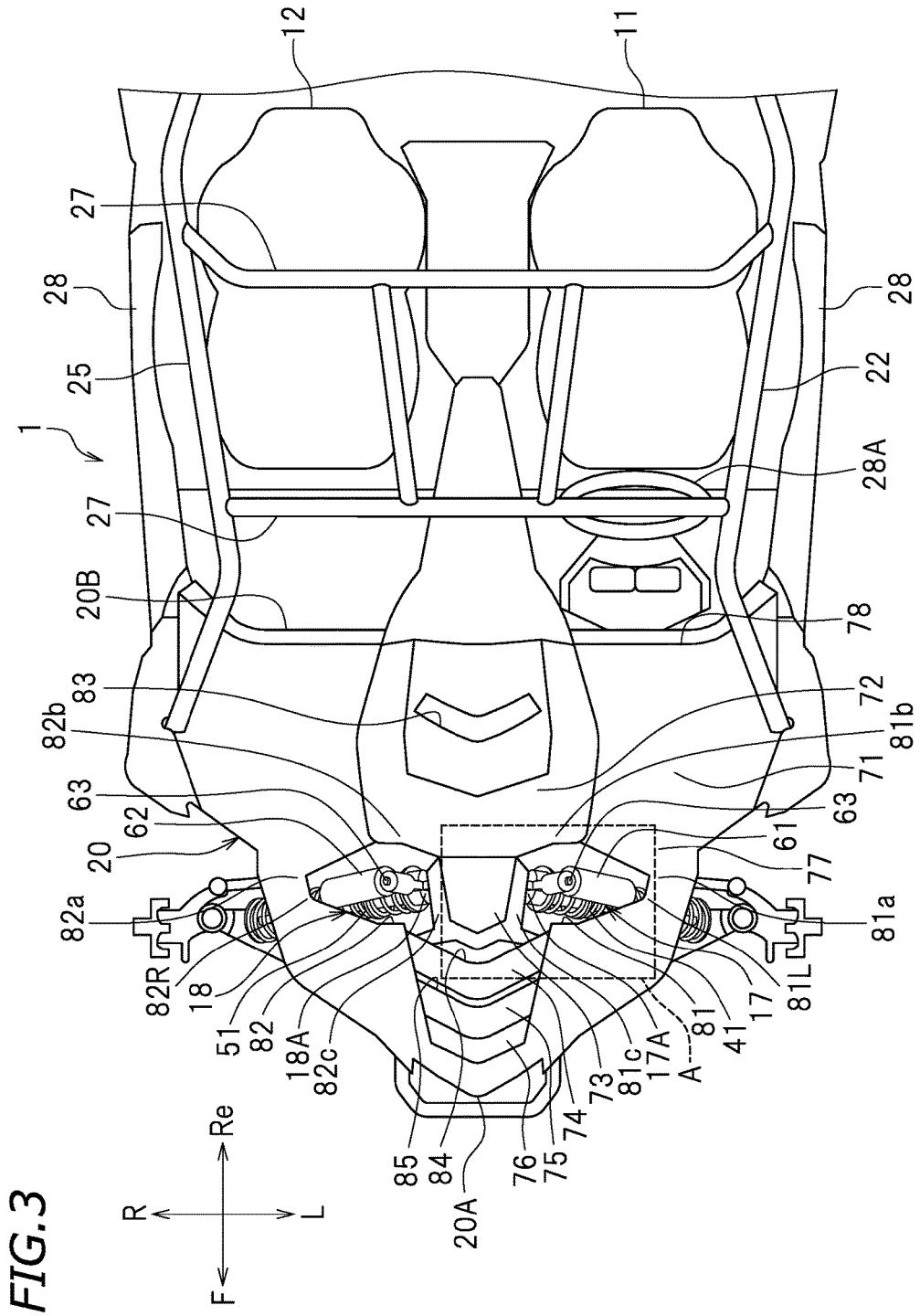
FIG. 3 is a plan view showing a portion of the ROV.
Figure 4:
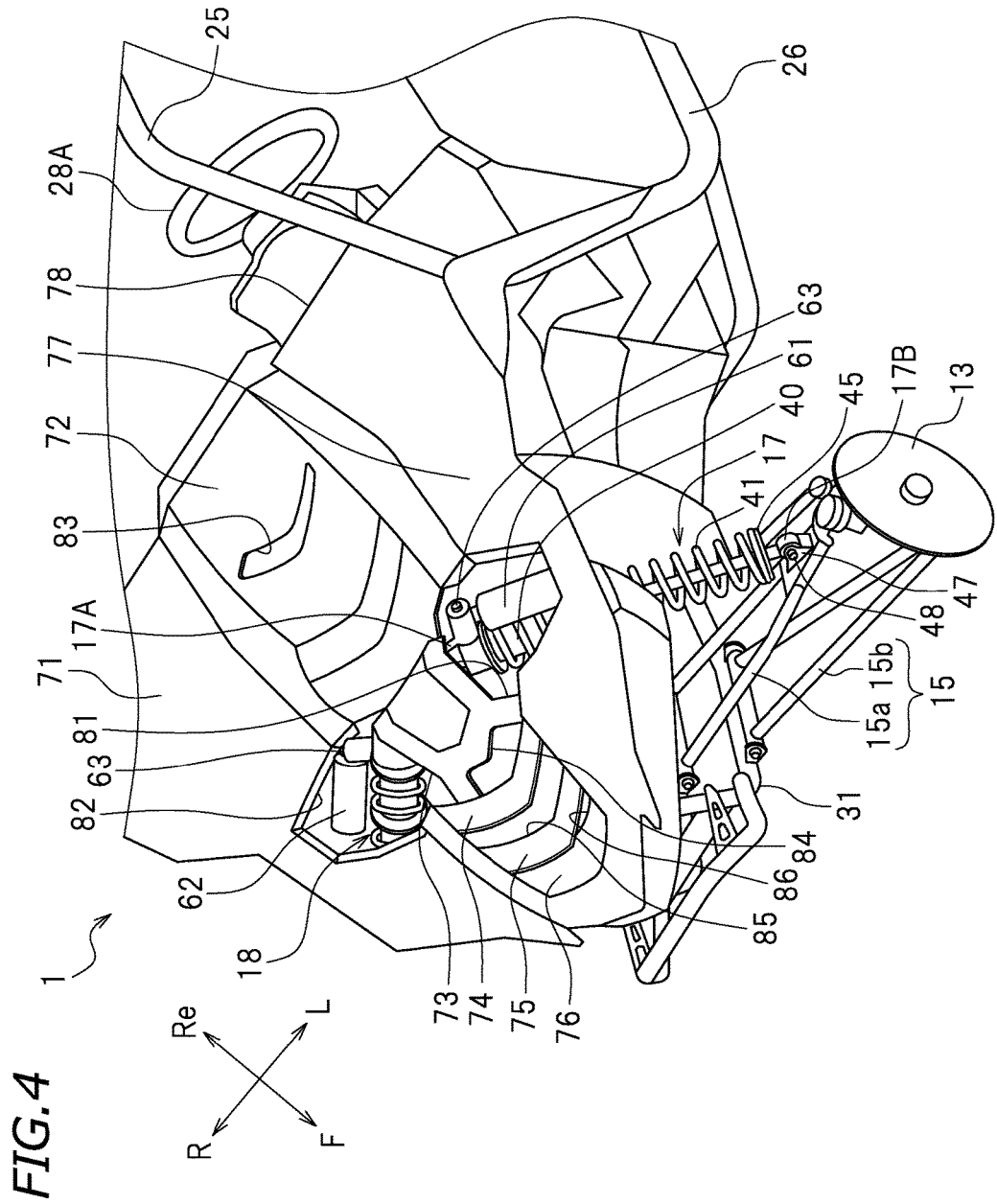
FIG. 4 is a perspective view showing a portion of the ROV.

Although the front cover 20 may be defined by a single member, the front cover 20 in the present preferred embodiment preferably includes a first front cover member 71 and a second front cover member 72, separate from each other, as shown in FIG. 3. The front cover 20 further includes a third front cover member 73, a fourth front cover member 74, a fifth front cover member 75, and a sixth front cover member 76. The first to sixth front cover members 71 to 76 are preferably fixed together by fasteners such as bolts, or may be bonded together. There is no particular limitation on the method of assembling the first to sixth front cover members 71 to 76 together. The first to sixth front cover members 71 to 76 may be made of the same material or of different materials.

As shown in FIG. 1, the front cover 20 includes a sloped portion 77 sloping downward toward the front of the vehicle, and a peak portion 78 located at the rear end of the sloped portion 77. The peak portion 78 of the front cover 20 protrudes upward and is the highest portion of the front cover 20. The steering handle 28A is located rearward of the peak portion 78. Note that the sloped portion 77 may include protrusions and depressions. In such a case, a portion of the sloped portion 77 protrudes upward. Then, the peak portion 78 as used herein refers to the rearmost one of the protruding portions of the front cover 20. The peak portion 78 is located rearward of the upper end portion 17A of the left shock absorber 17 and the upper end portion 18A of the right shock absorber 18.

As shown in FIG. 3, a left opening 81 and a right opening 82 are provided in the front cover 20. Other openings 83, 84, 85, and 86 (see FIG. 2) are also provided in the front cover 20. These openings 81 to 86 are preferably provided in the sloped portion 77 of the front cover 20.

Figure 8:
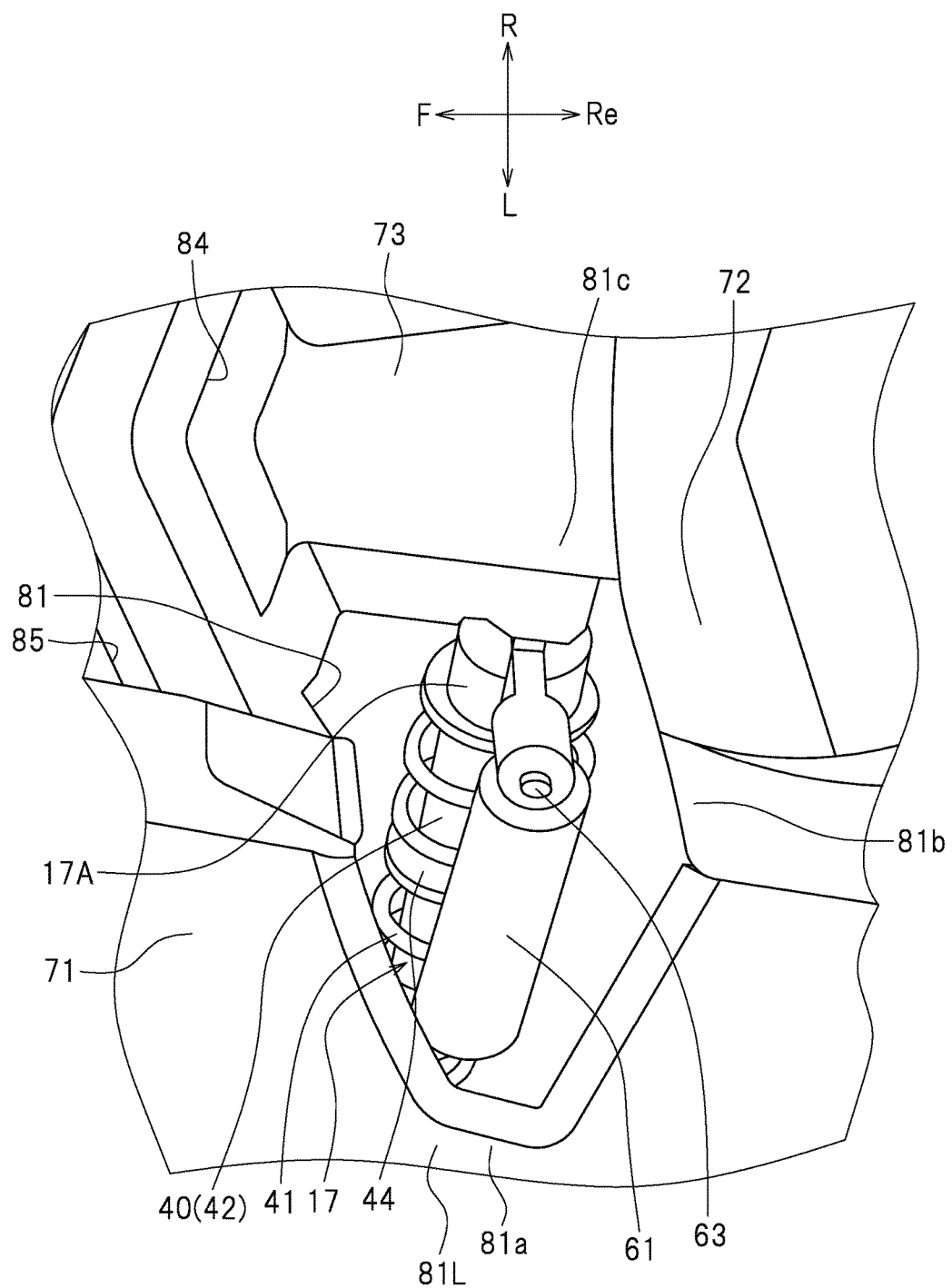
FIG. 8 is a perspective view showing section 'A' of FIG. 3 as seen diagonally from the upper left side.
Figure 9:
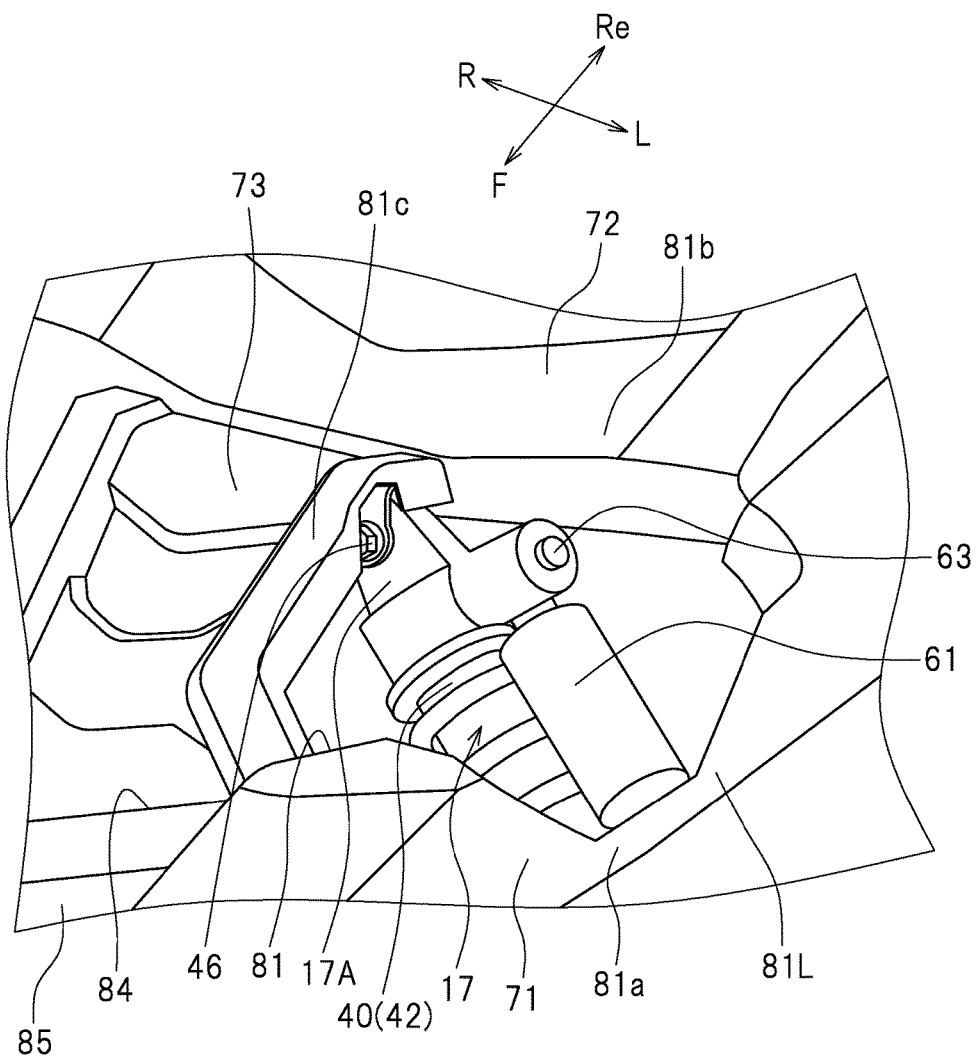
FIG. 9 is a perspective view showing section 'A' of FIG. 3 as seen diagonally from the front left side.

The left opening 81 is defined by the first front cover member 71, the second front cover member 72, and the third front cover member 73. As shown in FIGS. 8 and 9, the first front cover member 71 includes a first peripheral portion 81a defining a portion of the left opening 81, and the second front cover member 72 includes a second peripheral portion 81b defining another portion of the left opening 81. The third front cover member 73 includes a third peripheral portion 81c defining another portion of the left opening 81.

The right opening 82 is preferably in left-right symmetry with respect to the left opening 81. The right opening 82 is located to the left of the left opening 81. The right opening 82 is defined by the first front cover member 71, the second front cover member 72, and the third front cover member 73. The first front cover member 71 includes a first peripheral portion 82a defining a portion of the right opening 82, and the second front cover member 72 includes a second peripheral portion 82b defining another portion of the right opening 82. The third front cover member 73 includes a third peripheral portion 82c defining another portion of the right opening 82.

In the present preferred embodiment, the left opening 81 and the right opening 82 are each an opening whose perimeter is closed when the vehicle is seen from above. Note, however, that the left opening 81 and/or the right opening 82 may be an opening whose perimeter is partially open when the vehicle is seen from above. The left opening 81 and the right opening 82 are preferably provided in a front half of the front cover 20. The front half of the front cover 20, as used herein, refers to a portion of the front cover 20 that is forward of the middle position between a front end 20A and a rear end 20B of the front cover 20 in the vehicle front-rear direction.

The opening 83 is provided in the second front cover member 72. The opening 84 is defined by the third front cover member 73 and the fourth front cover member 74. The opening 85 is defined by the fourth front cover member 74 and the fifth front cover member 75. The opening 86 is defined by the fifth front cover member 75 and the sixth front cover member 76. Note that the openings 83, 84, 85, and 86 are not always necessary, and may be omitted.

The left opening 81 and the right opening 82 are each an opening having a large area, unlike openings through which screws and bolts are passed. The area of the left opening 81 when the vehicle is seen from above is greater than the cross-sectional area of the left shock absorber 17. The area of the right opening 82 when the vehicle is seen from above is greater than the cross-sectional area of the right shock absorber 18. Note that the cross-sectional area of the left shock absorber 17 varies between different positions along the left shock absorber 17. The cross-sectional area of the left cylinder 42 is greater than the cross-sectional area of the left piston rod 43. Here, the area of the left opening 81 when the vehicle is seen from above is greater than the cross-sectional area of the left cylinder 42. The area of the left opening 81 when the vehicle is seen from above is greater than a maximum value of the cross-sectional area of the left shock absorber 17. At the same time, the area of the right opening 82 when the vehicle is seen from above is greater than the cross-sectional area of the right shock absorber 18. The area of the right opening 82 when the vehicle is seen from above is greater than the cross-sectional area of the right cylinder 52. The area of the right opening 82 when the vehicle is seen from above is greater than a maximum value of the cross-sectional area of the right shock absorber 18. Note, however, that there is no particular limitation on the area of the left opening 81 and the right opening 82.

As shown in FIG. 3, when the vehicle is seen from above, at least a portion of the left shock absorber 17 is visible within the left opening 81, and at least a portion of the right shock absorber 18 is visible within the right opening 82. Here, the upper end portion 17A of the left shock absorber 17 is located so as to be visible within the left opening 81 when the vehicle is seen from above. A portion of the left spring 41 is located so as to be visible within the left opening 81 when the vehicle is seen from above. The upper end portion 18A of the right shock absorber 18 is located so as to be visible within the right opening 82 when the vehicle is seen from above. A portion of the right spring 51 is located so as to be visible within the right opening 82 when the vehicle is seen from above.

The front cover 20 surrounds the left side of the left shock absorber 17 and surrounds the right side of the right shock absorber 18 when the vehicle is seen from above. The peripheral portion of the left opening 81 of the front cover 20 includes a left peripheral portion 81L, which is located to the left of the upper end portion 17A of the left shock absorber 17 when the vehicle is seen from above. The left side of the upper end portion 17A of the left shock absorber 17 is protected by the left peripheral portion 81L of the front cover 20. The peripheral portion of the right opening 82 of the front cover 20 includes a right peripheral portion 82R, which is located to the right of the upper end portion 18A of the right shock absorber 18 when the vehicle is seen from above. The right side of the upper end portion 18A of the right shock absorber 18 is protected by the right peripheral portion 82R of the front cover 20.

As shown in FIG. 2, even though the ROV 1 includes the front cover 20, the upper end portion 17A of the left shock absorber 17 and the upper end portion 18A of the right shock absorber 18 are visible when the vehicle is seen from the front.

While the upper end portion 17A of the left shock absorber 17 is preferably located above the left opening 81 in the present preferred embodiment, as shown in FIG. 2, the upper end portion 17A of the left shock absorber 17 may be located below the left opening 81. The upper end portion 17A of the left shock absorber 17 projects past the left opening 81. Although not shown in the figures, the upper end portion 17A of the left shock absorber 17 is located above the peripheral portion of the left opening 81 of the front cover 20, along a vertical cross section extending in the vehicle width direction while passing through the upper end portion 17A of the left shock absorber 17. Similarly, while the upper end portion 18A of the right shock absorber 18 is preferably located above the right opening 82 in the present preferred embodiment, the upper end portion 18A of the right shock absorber 18 may be located below the right opening 82. The upper end portion 18A of the right shock absorber 18 projects past the right opening 82. The upper end portion 18A of the right shock absorber 18 is located above the peripheral portion of the right opening 82 of the front cover 20, along a vertical cross section extending in the vehicle width direction while passing through the upper end portion 18A of the right shock absorber 18.

As shown in FIGS. 8 and 9, at least a portion of the left damping force adjuster 61 is located so as to be visible through the left opening 81. At least a portion of the left damping force adjuster 61 may be located so as to be visible through the left opening 81 when the vehicle is seen from above, and may be located so as to be visible through the left opening 81 when seen from the front, diagonally from the front, diagonally from the side, or diagonally from the rear. In the present preferred embodiment, a portion of the left damping force adjuster 61 is located over the left opening 81. The control 63 of the left damping force adjuster 61 preferably is located over the left opening 81. Note, however, that the control 63 may be located so as to be visible through the left opening 81. For example, the control 63 may be located under the left opening 81. When the control 63 is located over the left opening 81, a passenger can easily operate the control 63. Also, where the control 63 is located so as to be visible through the left opening 81, a passenger can easily operate the control 63 through the left opening 81. For example, a passenger can put in his/her hand or a tool through the left opening 81, and operate the control 63 of the left damping force adjuster 61 by using the hand or tool through the left opening 81.

The above description similarly applies to the right damping force adjuster 62. That is, at least a portion of the right damping force adjuster 62 is located so as to be visible through the right opening 82. At least a portion of the right damping force adjuster 62 is located so as to be visible through the right opening 82 when the vehicle is seen from above, and may be located so as to be visible through the right opening 82 when seen from the front, diagonally from the front, diagonally from the side, or diagonally from the rear. A portion of the right damping force adjuster 62 is located over the right opening 82. The control 63 of the right damping force adjuster 62 is located over the right opening 82. Note, however, that the control 63 of the right damping force adjuster 62 may be located so as to be visible through the right opening 82. A passenger can easily operate the control 63 of the right damping force adjuster 62.

As described above, with the ROV 1 of the present preferred embodiment, the upper end portion 17A of the left shock absorber 17 and the upper end portion 18A of the right shock absorber 18 are located so as to be visible within the left opening 81 and the right opening 82, respectively, of the front cover 20 when the vehicle is seen from above. Even if the positions of the upper end portion 17A of the left shock absorber 17 and the upper end portion 18A of the right shock absorber 18 are high, or the position of the front cover 20 is low, it is possible to prevent the upper end portion 17A of the left shock absorber 17 and the upper end portion 18A of the right shock absorber 18 from interfering with the front cover 20. Therefore, the positions of the upper end portion 17A of the left shock absorber 17 and the upper end portion 18A of the right shock absorber 18 are raised to provide an improved stroke for the left shock absorber 17 and the right shock absorber 18. Moreover, the position of the front cover 20 is allowed to be low, thus giving a better front view for passengers seated in the seats 11 and 12. That is, it is possible to improve the front visibility of the ROV 1. Thus, with the ROV 1 of the present preferred embodiment, it is possible to provide an improved stroke for the left shock absorber 17 and the right shock absorber 18 and to also provide an improved front visibility.

With the ROV 1, the peak portion 78 of the front cover 20 is located rearward of the upper end portion 17A of the left shock absorber 17 and the upper end portion 18A of the right shock absorber 18, as shown in FIG. 1. The left opening 81 and the right opening 82 are provided in the sloped portion 77 of the front cover 20, and the peak portion 78 is located rearward of the left opening 81 and the right opening 82. Even if the upper end portion 17A of the left shock absorber 17 and the upper end portion 18A of the right shock absorber 18 are located at high positions, it is possible to provide an improved front visibility because the sloped portion 77 of the front cover 20, forward of the peak portion 78, slopes downward to the front of the vehicle.

With the ROV 1, as shown in FIG. 2, the upper end portion 17A of the left shock absorber 17 and the upper end portion 18A of the right shock absorber 18 are located so as to be visible when the vehicle is seen from the front. The upper end portion 17A of the left shock absorber 17 is located above at least a front portion of the left opening 81, and the upper end portion 18A of the right shock absorber 18 is located above at least a front portion of the right opening 82. Therefore, it is possible to locate the front cover 20 at a lower position and to provide an improved stroke for the left shock absorber 17 and the right shock absorber 18. This ingeniously provides both an improved stroke for the left shock absorber 17 and the right shock absorber 18 and an improved front visibility.

Particularly, with the ROV 1 of the present preferred embodiment, the upper end portion 17A of the left shock absorber 17 is located above the left opening 81, and the upper end portion 18A of the right shock absorber 18 is located above the right opening 82. That is, the upper end portion 17A of the left shock absorber 17 projects past the left opening 81, and the upper end portion 18A of the right shock absorber 18 projects past the right opening 82. Therefore, it is possible to locate the front cover 20 at a lower position while locating the upper end portion 17A of the left shock absorber 17 and the upper end portion 18A of the right shock absorber 18 at higher positions. This ingeniously provides both an improved stroke for the left shock absorber 17 and the right shock absorber 18 and an improved front visibility.

With the ROV 1, as shown in FIG. 3, the front cover 20 includes the first front cover member 71 including the first peripheral portion 81a defining a portion of the left opening 81, and the second front cover member 72 including the second peripheral portion 81b defining another portion of the left opening 81. Similarly, the first front cover member 71 includes the first peripheral portion 82a defining a portion of the right opening 82, and the second front cover member 72 includes the second peripheral portion 82b defining another portion of the right opening 82. In the present preferred embodiment, the left opening 81 and the right opening 82 do not need to be a single member. Therefore, it is possible to easily manufacture the front cover 20 including the left opening 81 and the right opening 82. It is also possible to maintain the left shock absorber 17 and the right shock absorber 18 by removing only the second front cover member 72, for example, without having to remove the first front cover member 71. Thus, it is possible to easily maintain the left shock absorber 17 and the right shock absorber 18.

In the present preferred embodiment, the left opening 81 and the right opening 82 are preferably separate from each other. Note, however, that the left opening 81 and the right opening 82 may be integral with each other. That is, the front cover 20 may include therein a single opening including the left opening 81 and the right opening 82 (hereinafter referred to as a "large opening"). In such a case, the upper end portion 17A of the left shock absorber 17 and the upper end portion 18A of the right shock absorber 18 are located so as to be visible within the large opening when the vehicle is seen from above.

In the present preferred embodiment, since the left opening 81 and the right opening 82 are preferably separate from each other, the area of each of the left opening 81 and the right opening 82 is smaller than the area of the large opening. Therefore, it is unlikely that a large object (e.g., a stone) can move into the front cover 20 through the left opening 81 or the right opening 82 while the ROV 1 is running. It is also easy to ensure a desirable rigidity of the front cover 20.

According to the present preferred embodiment, the front cover 20 includes the left peripheral portion 81L located to the left of the upper end portion 17A of the left shock absorber 17 when the vehicle is seen from above, and the right peripheral portion 82R located to the right of the upper end portion 18A of the right shock absorber 18 when the vehicle is seen from above. The upper end portion 17A of the left shock absorber 17 is protected by the left peripheral portion 81L of the front cover 20, and the upper end portion 18A of the right shock absorber 18 is protected by the right peripheral portion 82R of the front cover 20. Therefore, when a stone or the like, moves toward the vehicle from the left or right while the vehicle is running, the upper end portion 17A of the left shock absorber 17 and the upper end portion 18A of the right shock absorber 18 are protected from the stone or the like.

Each of the left opening 81 and the right opening 82 may be an opening whose perimeter is partially left open, but the openings preferably have a perimeter that is closed. Despite the left opening 81 and the right opening 82 being provided in the front cover 20, it is possible to significantly reduce or prevent a decrease in rigidity of the front cover 20. According to the present preferred embodiment, the front cover 20 has a high rigidity.

While the left opening 81 and the right opening 82 are preferably provided in the front half of the front cover 20 in the present preferred embodiment, there is no particular limitation on the positions of the left opening 81 and the right opening 82. Thus, a sufficient level of front visibility is ensured. For example, even if the upper end portion 17A of the left shock absorber 17 projects upward past the left opening 81 and the upper end portion 18A of the right shock absorber 18 projects upward past the right opening 82, it is possible to ensure a good front visibility.

In the present preferred embodiment, since the front cover 20 includes the sloped portion 77 sloping downward to the front of the vehicle, the front half of the front cover 20 is located at a low position. However, according to the present preferred embodiment, the upper end portion 17A of the left shock absorber 17 and the upper end portion 18A of the right shock absorber 18 are located at high positions while locating the front cover 20 at a low position, as described above. Therefore, the left shock absorber 17 and the right shock absorber 18 are located under the front half of the front cover 20.

According to the present preferred embodiment, when the vehicle is seen from above, the area of the left opening 81 is greater than the cross-sectional area of the left shock absorber 17, and the area of the right opening 82 is greater than the cross-sectional area of the right shock absorber 18. According to the present preferred embodiment, the left opening 81 and the right opening 82 each have a large area. Therefore, it is possible to more reliably avoid interference between the upper end portion 17A of the left shock absorber 17 and the front cover 20, and it is possible to more reliably avoid interference between the upper end portion 18A of the right shock absorber 18 and the front cover 20. This ingeniously provides both an improved stroke for the left shock absorber 17 and the right shock absorber 18 and an improved front visibility.

According to the present preferred embodiment, at least a portion of the left damping force adjuster 61 is located above the left opening 81, and at least a portion of the right damping force adjuster 62 is located above the right opening 82. The left damping force adjuster 61 is able to be operated from outside the front cover 20, and the right damping force adjuster 62 is able to be operated from outside the front cover 20. Therefore, the left damping force adjuster 61 and the right damping force adjuster 62 are operated easily, i.e., the damping forces of the left shock absorber 17 and the right shock absorber 18 are adjusted easily. Note that at least a portion of the left damping force adjuster 61 may be located so as to be visible through the left opening 81, and at least a portion of the right damping force adjuster 62 may be located so as to be visible through the right opening 82. Even then, the left damping force adjuster 61 is able to be operated from outside the front cover 20 through the left opening 81, and the right damping force adjuster 62 is able to be operated from outside the front cover 20 through the right opening 82.

According to the present preferred embodiment, the left damping force adjuster 61 is located to the left of the left shock absorber 17, and the right damping force adjuster 62 is located to the right of the right shock absorber 18. Since the left damping force adjuster 61 is located relatively far to the left, the left damping force adjuster 61 is easily operated from the left side of the ROV 1. Since the right damping force adjuster 62 is located relatively far to the right, the right damping force adjuster 62 is easily operated from the right side of the ROV 1. Thus, it is possible to easily adjust the damping forces of the left shock absorber 17 and the right shock absorber 18.

According to the present preferred embodiment, a portion of the left spring 41 of the left shock absorber 17 is located so as to be visible within the left opening 81 when the vehicle is seen from above. A portion of the right spring 51 of the right shock absorber 18 is located so as to be visible within the right opening 82 when the vehicle is seen from above. Therefore, the left spring 41 and the front cover 20 are unlikely to interfere with each other, and the right spring 51 and the front cover 20 are unlikely to interfere with each other. Thus, the position of the front cover 20 is allowed to be low. Therefore, it is possible to provide an improved front visibility.

According to the present preferred embodiment, the radiator 68 is located under the front cover 20 and rearward of the left shock absorber 17 and the right shock absorber 18. Therefore, a space that is under the front cover 20 and rearward of the left shock absorber 17 and the right shock absorber 18 is effectively utilized as a space to install the radiator 68. According to the present preferred embodiment, the radiator 68 is located under the front cover 20 while providing both an improved stroke for the left shock absorber 17 and the right shock absorber 18 and an improved front visibility, thus enabling a reduction in the size of the ROV 1.

According to the present preferred embodiment, a portion of the left shock absorber 17 and a portion of the radiator 68 are located next to each other in the vehicle front-rear direction, and a portion of the right shock absorber 18 and a portion of the radiator 68 are located next to each other in the vehicle front-rear direction. Therefore, as compared with a case where the left shock absorber 17, the radiator 68, and the right shock absorber 18 are located next to one another in the vehicle width direction, it is possible to reduce the size of the ROV 1 in the vehicle width direction. Therefore, it is possible to reduce the size of the ROV 1 in the vehicle width direction while providing both an improved stroke for the left shock absorber 17 and the right shock absorber 18 and an improved front visibility.

Figure 10:
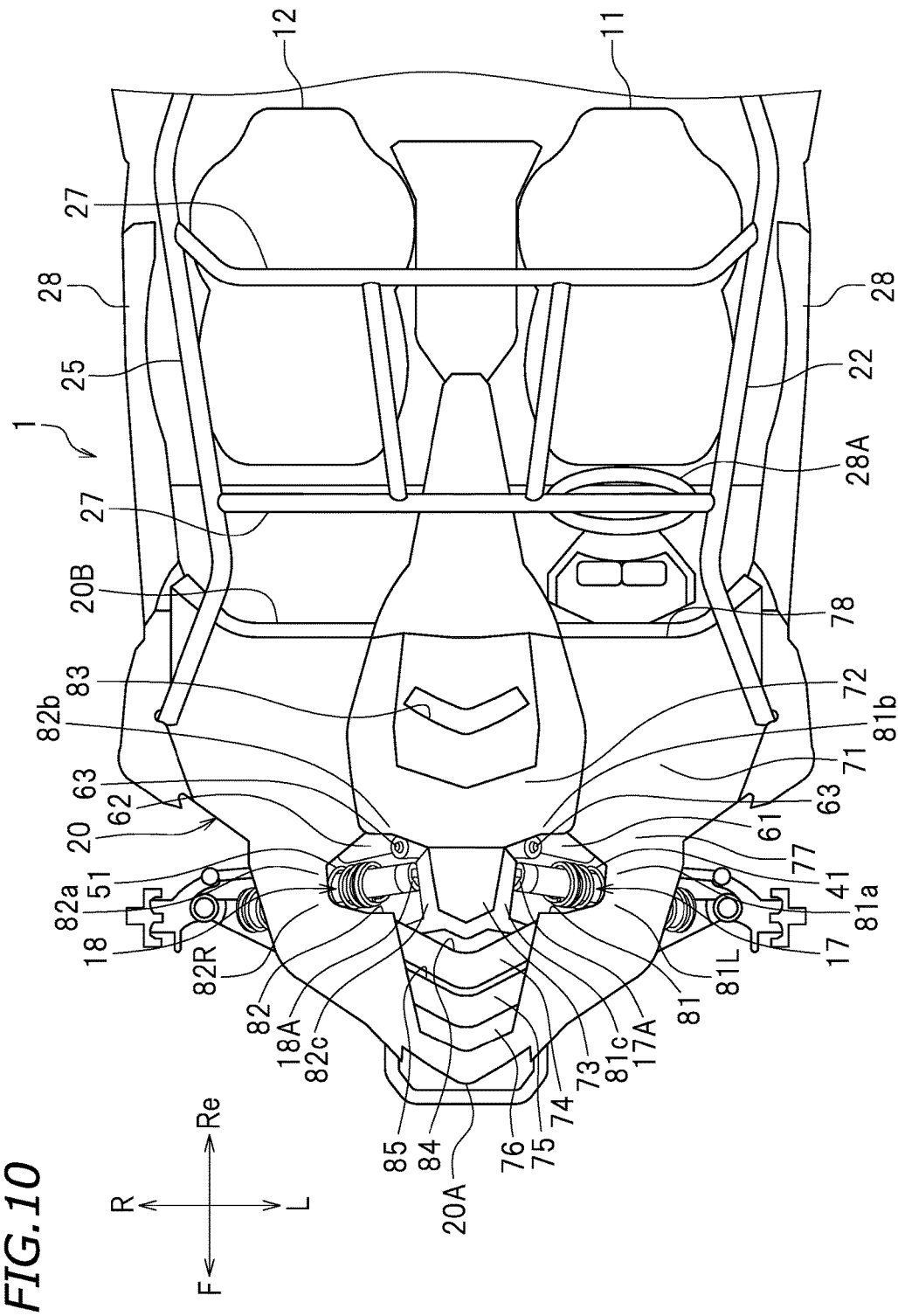
FIG. 10 is a plan view showing a portion of an ROV according to another preferred embodiment of the present invention.
Figure 11:
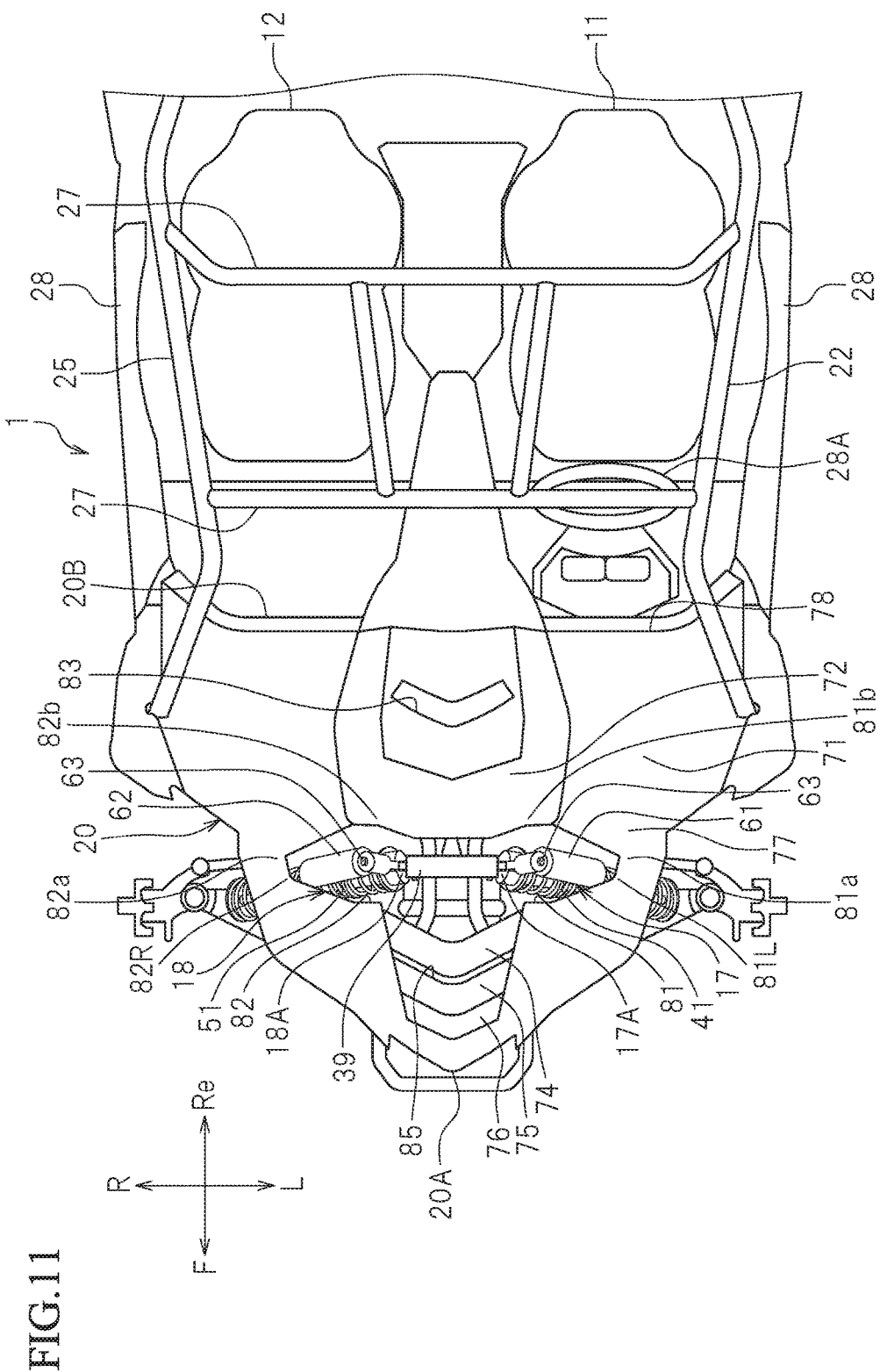
FIG. 11 is a plan view showing a portion of the ROV.

The preferred embodiments described above are merely exemplary preferred embodiments of the present invention, and the present invention can be carried out in various other preferred embodiments. For example, as shown in FIG. 10, the left damping force adjuster 61 may be located on the rear of the left shock absorber 17, and the right damping force adjuster 62 may be located on the rear of the right shock absorber 18. At least a portion (e.g., the control 63) of the left damping force adjuster 61 may be located so as to be visible within the left opening 81 when the vehicle is seen from above. At least a portion (e.g., the control 63) of the right damping force adjuster 62 may be located so as to be visible within the right opening 82 when the vehicle is seen from above.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the present invention. These examples are described herein with the understanding that such examples are not intended to limit the present invention to the preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
    a vehicle body frame;
    a plurality of seats located next to each other in a vehicle width direction, each of the plurality of seats being supported by the vehicle body frame;
    a left front wheel located forward of the plurality of seats;
    a right front wheel located forward of the plurality of seats and to the right of the left front wheel;
    a left arm extending in the vehicle width direction, the left arm including a wheel connection portion connected to the left front wheel and a frame connection portion pivotally connected to the vehicle body frame;
    a right arm located to the right of the left arm and extending in the vehicle width direction, the right arm including a wheel connection portion connected to the right front wheel and a frame connection portion pivotally connected to the vehicle body frame;
    a left shock absorber including an upper end portion pivotally connected to the vehicle body frame, and a lower end portion pivotally connected to the left arm;
    a right shock absorber located to the right of the left shock absorber, the right shock absorber including an upper end portion pivotally connected to the vehicle body frame and a lower end portion pivotally connected to the right arm; and
    a front cover located forward of the plurality of seats; wherein
    at least one opening is provided in the front cover; and
    the upper end portion of the left shock absorber and the upper end portion of the right shock absorber are located above at least a portion of the at least one opening in the front cover.

2. The vehicle according to claim 1, wherein the upper end portion of the left shock absorber and the upper end portion of the right shock absorber are located above a lowermost portion of a bottom edge of the at least one opening.

3. The vehicle according to claim 1, further comprising a bracket fixed to the vehicle body frame and located forward of the plurality of seats and substantially at a center of the vehicle in a vehicle width direction; and
    at least a portion of the bracket is located above at least a portion of the at least one opening in the front cover.

4. The vehicle according to claim 1, further comprising a bracket fixed to the vehicle body frame and located forward of the plurality of seats and substantially at a center of the vehicle in a vehicle width direction; and
    an uppermost portion of the bracket is located above a lowermost portion of a bottom edge of the at least one opening.

5. The vehicle according to claim 1, wherein the at least one opening is defined by an upper edge of the at least one opening.

6. The vehicle according to claim 1, wherein the upper end portion of the left shock absorber and the upper end portion of the right shock absorber are visible when the vehicle is seen from a front of the vehicle.

7. The vehicle according to claim 1, further comprising an additional opening in the front cover.

8. The vehicle according to claim 1, an area of the front cover is greater than an area of the at least one opening when the vehicle is seen from above.

9. The vehicle according to claim 1, wherein the at least one opening is a single opening.

10. A vehicle comprising:
a vehicle body frame;
a plurality of seats located next to each other in a vehicle width direction, each of the plurality of seats being supported by the vehicle body frame;
a left front wheel located forward of the plurality of seats;
a right front wheel located forward of the plurality of seats and to the right of the left front wheel;
a left arm extending in the vehicle width direction, the left arm including a wheel connection portion connected to the left front wheel and a frame connection portion pivotally connected to the vehicle body frame;
a right arm located to the right of the left arm and extending in the vehicle width direction, the right arm including a wheel connection portion connected to the right front wheel and a frame connection portion pivotally connected to the vehicle body frame;
a left shock absorber including an upper end portion pivotally connected to the vehicle body frame, and a lower end portion pivotally connected to the left arm;
a right shock absorber located to the right of the left shock absorber, the right shock absorber including an upper end portion pivotally connected to the vehicle body frame and a lower end portion pivotally connected to the right arm;
a front cover located forward of the plurality of seats; and
a bracket fixed to the vehicle body frame and located forward of the plurality of seats and substantially at a center of the vehicle in a vehicle width direction; wherein
at least one opening is provided in the front cover;
the upper end portion of the left shock absorber and the upper end portion of the right shock absorber are connected to the bracket;
the bracket is visible within the at least one opening when the vehicle is seen from above; and
the upper end portion of the left shock absorber and the upper end portion of the right shock absorber are visible when the vehicle is seen from a front of the vehicle in a front elevation view which is horizontal with respect to ground.

11. The vehicle according to claim 10, wherein the at least one opening is defined by an upper edge of the at least one opening.

12. The vehicle according to claim 10, an area of the front cover is greater than an area of the at least one opening when the vehicle is seen from above.

13. The vehicle according to claim 10, wherein the at least one opening is a single opening.

14. A vehicle comprising:
a vehicle body frame;
a plurality of seats located next to each other in a vehicle width direction, each of the plurality of seats being supported by the vehicle body frame;
a left front wheel located forward of the plurality of seats;
a right front wheel located forward of the plurality of seats and to the right of the left front wheel;
a left arm extending in the vehicle width direction, the left arm including a wheel connection portion connected to the left front wheel and a frame connection portion pivotally connected to the vehicle body frame;
a right arm located to the right of the left arm and extending in the vehicle width direction, the right arm including a wheel connection portion connected to the right front wheel and a frame connection portion pivotally connected to the vehicle body frame;
a left shock absorber including an upper end portion pivotally connected to the vehicle body frame, and a lower end portion pivotally connected to the left arm;
a right shock absorber located to the right of the left shock absorber, the right shock absorber including an upper end portion pivotally connected to the vehicle body frame and a lower end portion pivotally connected to the right arm;
a front cover located forward of the plurality of seats; and
a bracket fixed to the vehicle body frame and located forward of the plurality of seats and substantially at a center of the vehicle in a vehicle width direction; wherein
at least one opening is provided in the front cover;
the upper end portion of the left shock absorber and the upper end portion of the right shock absorber are connected to the bracket;
the bracket is visible within the at least one opening when the vehicle is seen from above; and
the vehicle further comprises an additional opening in the front cover.

15. A vehicle comprising:
a vehicle body frame;
a plurality of seats located next to each other in a vehicle width direction, each of the plurality of seats being supported by the vehicle body frame;
a left front wheel located forward of the plurality of seats;
a right front wheel located forward of the plurality of seats and to the right of the left front wheel;
a left arm extending in the vehicle width direction, the left arm including a wheel connection portion connected to the left front wheel and a frame connection portion pivotally connected to the vehicle body frame;
a right arm located to the right of the left arm and extending in the vehicle width direction, the right arm including a wheel connection portion connected to the right front wheel and a frame connection portion pivotally connected to the vehicle body frame;
a left shock absorber including an upper end portion pivotally connected to the vehicle body frame, and a lower end portion pivotally connected to the left arm;
a right shock absorber located to the right of the left shock absorber, the right shock absorber including an upper end portion pivotally connected to the vehicle body frame and a lower end portion pivotally connected to the right arm;
a front cover located forward of the plurality of seats; and
a bracket fixed to the vehicle body frame and located forward of the plurality of seats and substantially at a center of the vehicle in a vehicle width direction; wherein
at least one opening is provided in the front cover;
the upper end portion of the left shock absorber and the upper end portion of the right shock absorber are directly connected to the bracket;
the bracket is located to the left of a right end of the at least one opening, the right of a left end of the at least one opening, rearward of a front end of the at least one opening, and frontward of a rear end of the at least one opening when the vehicle is seen from above; and
the bracket is located above the front end of the at least one opening.

16. The vehicle according to claim 15, wherein the upper end portion of the left shock absorber and the upper end portion of the right shock absorber are visible when the vehicle is seen from a front of the vehicle.

17. The vehicle according to claim 15, an area of the front cover is greater than an area of the at least one opening when the vehicle is seen from above.

18. The vehicle according to claim 15, wherein the at least one opening is a single opening.

19. A vehicle comprising:
a vehicle body frame;
a plurality of seats located next to each other in a vehicle width direction, each of the plurality of seats being supported by the vehicle body frame;
a left front wheel located forward of the plurality of seats;
a right front wheel located forward of the plurality of seats and to the right of the left front wheel;
a left arm extending in the vehicle width direction, the left arm including a wheel connection portion connected to the left front wheel and a frame connection portion pivotally connected to the vehicle body frame;
a right arm located to the right of the left arm and extending in the vehicle width direction, the right arm including a wheel connection portion connected to the right front wheel and a frame connection portion pivotally connected to the vehicle body frame;
a left shock absorber including an upper end portion pivotally connected to the vehicle body frame, and a lower end portion pivotally connected to the left arm;
a right shock absorber located to the right of the left shock absorber, the right shock absorber including an upper end portion pivotally connected to the vehicle body frame and a lower end portion pivotally connected to the right arm;
a front cover located forward of the plurality of seats; and
a bracket fixed to the vehicle body frame and located forward of the plurality of seats and substantially at a center of the vehicle in a vehicle width direction; wherein
at least one opening is provided in the front cover;
the upper end portion of the left shock absorber and the upper end portion of the right shock absorber are connected to the bracket;
the bracket is located to the left of a right end of the at least one opening, the right of a left end of the at least one opening, rearward of a front end of the at least one opening, and frontward of a rear end of the at least one opening when the vehicle is seen from above;

the bracket is located above the front end of the at least one opening; and
the at least one opening is defined by an upper edge of the at least one opening.

20. A vehicle comprising:
a vehicle body frame;
a plurality of seats located next to each other in a vehicle width direction, each of the plurality of seats being supported by the vehicle body frame;
a left front wheel located forward of the plurality of seats;
a right front wheel located forward of the plurality of seats and to the right of the left front wheel;
a left arm extending in the vehicle width direction, the left arm including a wheel connection portion connected to the left front wheel and a frame connection portion pivotally connected to the vehicle body frame;
a right arm located to the right of the left arm and extending in the vehicle width direction, the right arm including a wheel connection portion connected to the right front wheel and a frame connection portion pivotally connected to the vehicle body frame;
a left shock absorber including an upper end portion pivotally connected to the vehicle body frame, and a lower end portion pivotally connected to the left arm;
a right shock absorber located to the right of the left shock absorber, the right shock absorber including an upper end portion pivotally connected to the vehicle body frame and a lower end portion pivotally connected to the right arm;
a front cover located forward of the plurality of seats; and
a bracket fixed to the vehicle body frame and located forward of the plurality of seats and substantially at a center of the vehicle in a vehicle width direction; wherein
at least one opening is provided in the front cover;
the upper end portion of the left shock absorber and the upper end portion of the right shock absorber are connected to the bracket;
the bracket is located to the left of a right end of the at least one opening, the right of a left end of the at least one opening, rearward of a front end of the at least one opening, and frontward of a rear end of the at least one opening when the vehicle is seen from above;
the bracket is located above the front end of the at least one opening; and
the vehicle further comprises an additional opening in the front cover.

* * * * *